No. 887,974. PATENTED MAY 19, 1908.
A. STEINBART.
ART OF SMELTING ORE.
APPLICATION FILED MAR. 23, 1906.
2 SHEETS—SHEET 1.
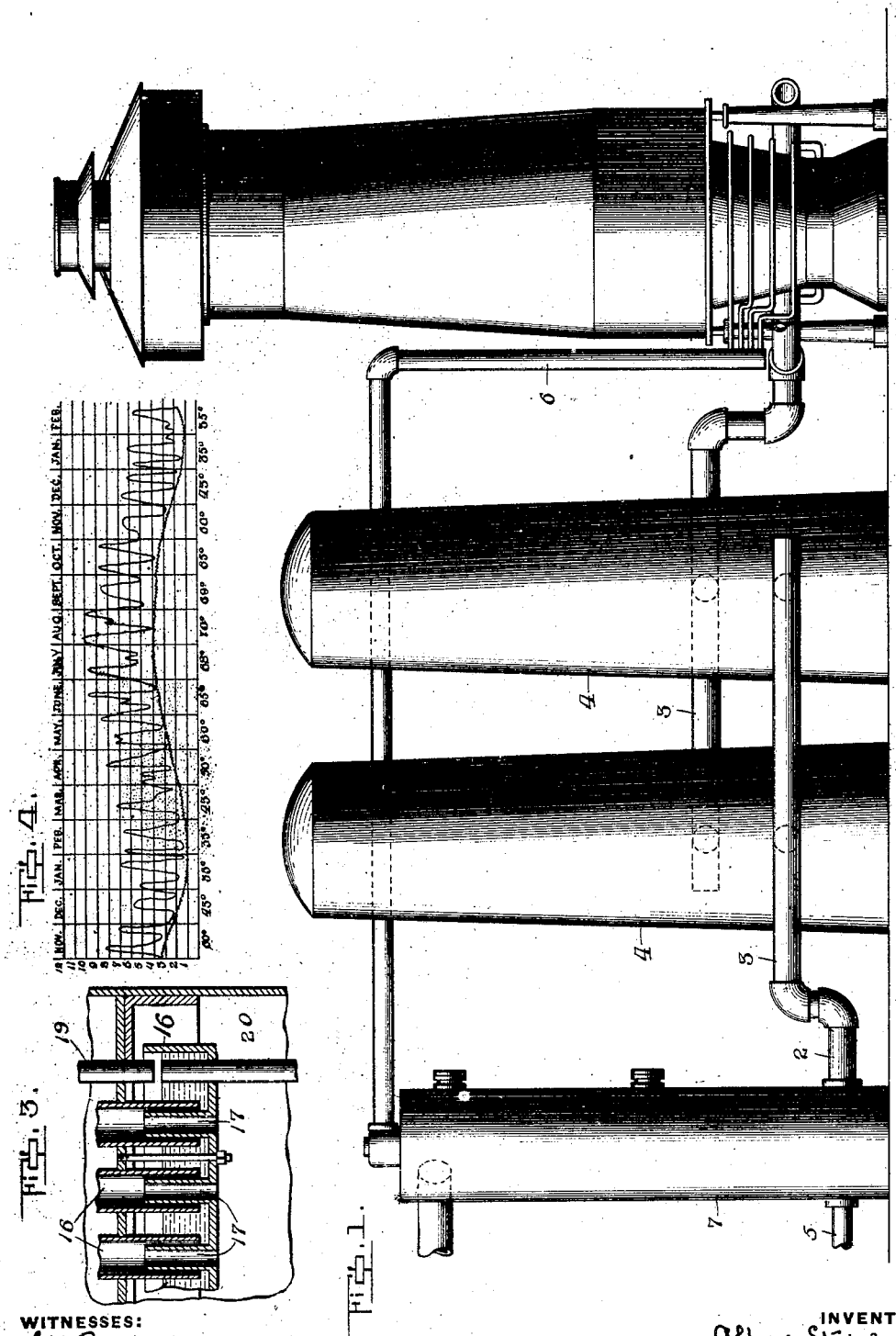
WITNESSES:
INVENTOR No. 887,974. PATENTED MAY 19, 1908.
A. STEINBART
ART OF SMELTING ORE.
APPLICATION FILED MAR. 23, 1906.
2 SHEETS—SHEET 2.
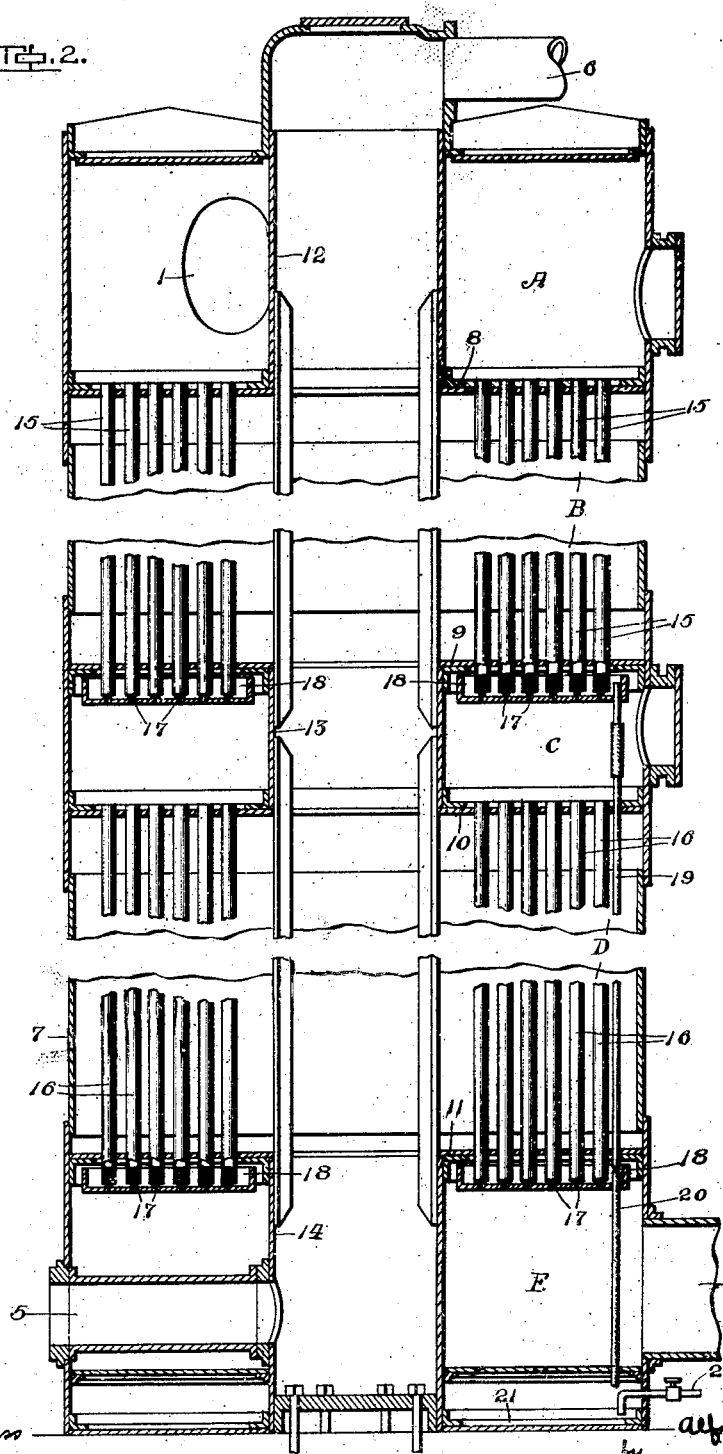

UNITED STATES PATENT OFFICE.

ALFRED STEINBART, OF PITTSBURG, PENNSYLVANIA, ASSIGNOR OF ONE-HALF TO GEORGE L. COLLARD, OF CLAIRTON, PENNSYLVANIA.

ART OF SMELTING ORE.

No. 887,974.

Specification of Letters Patent.

Patented May 19, 1908.

Application filed March 23, 1906. Serial No. 307,683.

*To all whom it may concern:*

Be it known that I, ALFRED STEINBART, residing at Pittsburg, in the county of Allegheny and State of Pennsylvania, a citizen of the United States, have invented or discovered a certain new and useful Improvement in the Art of Smelting Ore, of which improvement the following is a specification.

The air forced under pressure into blast furnaces, contains at all times a considerable percentage of water vapor, which is decomposed in the furnace with the consequent absorption of a large amount of heat. If the percentage of water vapor was constant, the loss due to the absorption of heat would not be serious, but as the amount of water vapor varies within wide limits and the changes occur rapidly, the absorption of heat due to decomposition which is proportional to the amount of water decomposed would cause changes in the working of the furnace, unless provision is made to maintain uniform working. As for example when a rapid rise in the percentage of water occurs, there will be a proportional increase in the amount of heat absorbed in decomposing the water and a consequent chilling of the furnace and production of inferior metal. Hence provision is made for the maintenance of a reserve of heat, which may be employed when the percentage of moisture increases. This reserve of heat may be obtained either by the use of an excess of coke in the furnace or by maintaining the hot blast stoves at a higher temperature than normally required in smelting and tempering the heated air by cold air introduced into the blast by a by-pass, between the stoves and furnace. When an excess of moisture requires more heat in the furnace, the flow of cold air is reduced. As this reserve, in whatever form it may be provided, must be sufficiently large to compensate for the greatest absorption which may occur, from the cause stated, there is a constant waste of a large amount of fuel to provide for a contingency which may last for a few hours only, and may not occur again for several days.

The invention described herein has for its object the reduction of the percentage of the water vapor and its maintenance at a substantially uniform point.

The invention is hereinafter more fully described and claimed.

In the accompanying drawings forming a part of this specification, Figure 1 is an elevation showing a blast furnace, stoves and a condensing apparatus with suitable connections between such parts or elements; Fig. 2 is a sectional elevation on an enlarged scale of the condenser; Fig. 3 is a sectional detail view of a portion of the condenser; Fig. 4 is a diagram showing approximately the variation from month to month of moisture in the atmosphere and also indicating approximately as regards removal of moisture of my improved method.

It is well known that a given volume of air as a cubic foot, at a given temperature, as seventy degrees (70°) Fahr., can contain only a definite amount of water vapor, as eight grains. If the temperature of this quantity of air be lowered to fifty degrees (50°) Fahr. about one-half the water vapor will be condensed. Or if a given volume of air, as two cubic feet at seventy degrees (70°) Fahr. be compressed into a space of one cubic foot, and the temperature of the compressed air be reduced to seventy degrees, one-half of the sixteen grains of the water vapor contained by the air prior to compression and cooling, will be condensed. If the temperature of this compressed air be further reduced say to fifty degrees (50°) Fahr. a further condensation of water vapor will occur and the amount of water vapor reduced to four grains, or two grains per cubic foot at atmospheric pressure.

In the practice of my invention the air is forced through a condenser, the hot blast stoves, and the charge in the furnace. The resistance presented by the stoves and the charge in the furnace (principally the latter) to the passage of the air amounts to about fifteen pounds per square inch. In other words the air must be subjected to a pressure of about fifteen pounds per square inch to insure a proper flow thereof through the furnace. This pressure is sufficient to reduce the volume of air one half and if the heat due to compression be removed, and suitable provision is made for the separation of the condensed vapor, a large percentage of the water vapor in the air prior to compression is extracted. The condenser through which the air passes on its way to the furnace affords a means for cooling the compressed air not only to atmospheric temperature but also considerably below atmospheric temperature, so that a still larger percentage of the vapor contained in the air before compression, is removed.

While any suitable cooling medium can be employed in the condenser, I have found that by introducing water from any natural source as a lake, river, well, etc., in connection with the amount of compression described, the water vapor in the air can be reduced as low as is practically necessary and maintained at a practically uniform amount. The employment of water from a natural source is also advantageous in that the water employed for cooling the bosh can be utilized in the condenser the latter being interposed between the source and the furnace.

As shown in Fig. 1 the inlet port 1 of the condenser is connected by a suitable pipe to the blowing engine, and the outlet port 2 to the pipes 3 leading to the hot blast stoves 4. The water inlet port 5 is connected to the pumps or other suitable source employed for supplying the cooling boxes on the bosh. The water or so much thereof as is required flows up through the condenser or in opposition to the direction of flow of the air, and is conducted by the pipe 6 to the bosh boxes.

While not limiting the invention as regards the use of any suitable form or construction of condenser, it is preferred to employ the construction herein shown. This condenser consists of an external shell 7, divided compartments or chambers, A, B, C, D, E, etc., by transverse annular partitions 8, 9, 10, 11, etc. The end and one or more of the intermediate compartments are made closed by shells 12, 13 and 14, extending respectively from the upper head to the partition 8, from partition 9 to partition 10 and from partition 11 to the lower head. The upper chamber or compartment A is connected by clusters of tubes 15 with the compartment C, which in turn is connected by clusters of tubes 16 with the lower compartment E. These tubes are secured preferably by expanding into holes formed through the partitions 8, 9, 10 and 11; and in order to facilitate the replacement of tubes of the lower series, the latter are made of an external diameter slightly less than the internal diameter of the upper tubes, thus permitting the lower tubes to be passed up through the upper tubes.

The water for cooling the tubes flows into the lower end of the central shaft and spreads laterally around the tubes 15 and 16 extending across the compartments B and D. The air passing through these tubes is cooled and a portion of the water vapor will be condensed on the inner walls of the tubes. In order to remove this condensed water, the tubes 15 and 16 project a short distance beyond the partitions 9 and 11, and such projecting ends fit loosely over nipples 17 formed on and secured in trays 18. Sufficient space is provided between the nipples and the inner walls of the tubes to permit water condensing in the tubes to flow down into the trays. The nipples are formed with axial openings through which the air will pass into the compartments, C and E. The trays are preferably made in sections which are supported in position by bolts, so that said trays can be removed and cleaned. Escape pipes 19 and 20 are provided for drawing off the water collected in the trays. These pipes 19 and 20 discharge into a receptacle 21 in the lower compartment, from which the water can be removed from time to time by the blow-off pipe 22. The receptacle in the lower compartment should be covered to prevent the air from taking up moisture from the water in the receptacle.

It is characteristic of my invention that after the condenser has been installed and the proper connections made, there will be very little, if any, additional expense added to the operation of the furnace. If the water for the condenser and boshes is drawn from a river, the temperature of which varies slowly from 70° to 32° Fahr., and is lower than the average temperature of the season, the moisture in the blast may be kept down to 4 grains per cubic foot in summer and one grain per cubic foot in winter, the change from one extreme to the other being slow. While without my improvement the moisture would vary frequently between four and ten grains in summer, and between one and seven grains in winter. If lake water, which varies from 55° Fahr. in summer to 40° Fahr. in winter be used, the moisture will be kept down to about two and one half grains in summer and one and one-half in winter. If well water, which has approximately the same temperature the year around, be used, moisture can be kept down to about two grains.

Fig. 4 illustrates diagrammatically the result of my improved method as regards the elimination of moisture. The horizontal lines indicate grains of moisture per cubic foot of air, and the vertical lines indicate average atmospheric temperature during months indicated at the top of the figure. The irregular or abruptly fluctuating line indicates the moisture content of the air at atmospheric temperature and the curved line indicates approximately the result produced by treating the air as herein described with river water. This diagram is to be considered as indicating approximate relations and not actual results.

I claim herein as my invention:

1. As an improvement in the art of smelting ore, the method herein described which consists in lessening the percentage of moisture in the air to be forced into the furnace to a point below that of saturation at atmospheric pressure and at the temperature of a natural cooling medium, maintaining the moisture at a slowly varying percentage below such point of saturation by subjecting the air to compression and to such natural cooling medium and forcing the air into the furnace.

2. As an improvement in the art of smelting ore, the method herein described, which consists in compressing the air, reducing the temperature by the action of a cooling medium having a normal temperature above 32° Fah. and thereby reducing the moisture content of the air, maintaining such moisture content at a slowly varying percentage less than that of saturation at atmospheric pressure and the temperature of the cooling medium and forcing the air into the furnace.

In testimony whereof, I have hereunto set my hand.

ALFRED STEINBART.

Witnesses:
   CHARLES BARNETT,
   J. HERBERT BRADLEY.